(12) United States Patent
Bedetti et al.

(10) Patent No.: US 6,698,923 B2
(45) Date of Patent: Mar. 2, 2004

(54) DEVICE FOR CONTROLLING A COOKING PROCESS

(75) Inventors: Nicola Bedetti, Como (IT); Gianpiero Santacatterina, Sangiano (IT); Daniele Turetta, Ispra (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/091,013

(22) Filed: Mar. 4, 2002

(65) Prior Publication Data

US 2002/0124737 A1 Sep. 12, 2002

(30) Foreign Application Priority Data

Mar. 9, 2001 (IT) ..................... VA20010005 U

(51) Int. Cl.[7] .................................. G01K 1/08
(52) U.S. Cl. .................. 374/208; 374/149; 374/155
(58) Field of Search .................. 374/208, 150, 374/142, 149, 151, 155; 219/600; 340/870.17, 870.16

(56) References Cited

U.S. PATENT DOCUMENTS

| | | | | |
|---|---|---|---|---|
| 3,582,921 A | * | 6/1971 | Krieger | 340/870.09 |
| 4,088,863 A | * | 5/1978 | Jellies | 219/713 |
| 4,230,731 A | * | 10/1980 | Tyler | 426/233 |
| 4,346,836 A | * | 8/1982 | Nagel | 236/26 A |
| 4,377,733 A | * | 3/1983 | Yamaguchi et al. | 219/713 |
| 4,471,354 A | * | 9/1984 | Smith | 340/870.17 |
| 4,475,024 A | * | 10/1984 | Tateda | 219/713 |
| 4,518,839 A | * | 5/1985 | Taguchi et al. | 219/713 |
| 4,626,662 A | * | 12/1986 | Woolf | 219/501 |
| 4,747,413 A | * | 5/1988 | Bloch | 600/549 |
| 5,033,864 A | * | 7/1991 | Lasecki et al. | 374/151 |
| 5,323,692 A | * | 6/1994 | Grzywna et al. | 99/343 |
| 5,555,994 A | * | 9/1996 | Chen | 220/287 |
| 5,575,563 A | * | 11/1996 | Chiu et al. | 374/141 |
| 5,682,149 A | * | 10/1997 | Hofman | 340/870.17 |
| 6,075,463 A | * | 6/2000 | Wauer | 340/870.17 |
| 6,080,972 A | * | 6/2000 | May | 219/494 |
| 6,412,398 B1 | * | 7/2002 | Norcross et al. | 99/342 |
| RE37,988 E | * | 2/2003 | Uss | 99/343 |

FOREIGN PATENT DOCUMENTS

| | | | | |
|---|---|---|---|---|
| DE | 3636173 A1 | * | 5/1988 | A47J/43/07 |
| JP | 56107139 A | * | 8/1981 | G01K/7/00 |

* cited by examiner

Primary Examiner—Diego Gutierrez
Assistant Examiner—Lydia M. De Jesús
(74) Attorney, Agent, or Firm—Thomas J. Roth; Robert O. Rice; John F. Colligan

(57) ABSTRACT

A device for collecting data relating to a cooking and/or heating process performed on a hob comprising at least one sensor associated with wireless data transmission means and means for receiving the signals transmitted from the data transmission means and connected to a hob management system for the purpose of permitting automatic control of the process. The sensor is fitted substantially at one end of a kitchen utensil suitable for coming into contact with the food to be cooked and/or heated, while the data transmission means are arranged in the handle of the kitchen utensil.

8 Claims, 4 Drawing Sheets

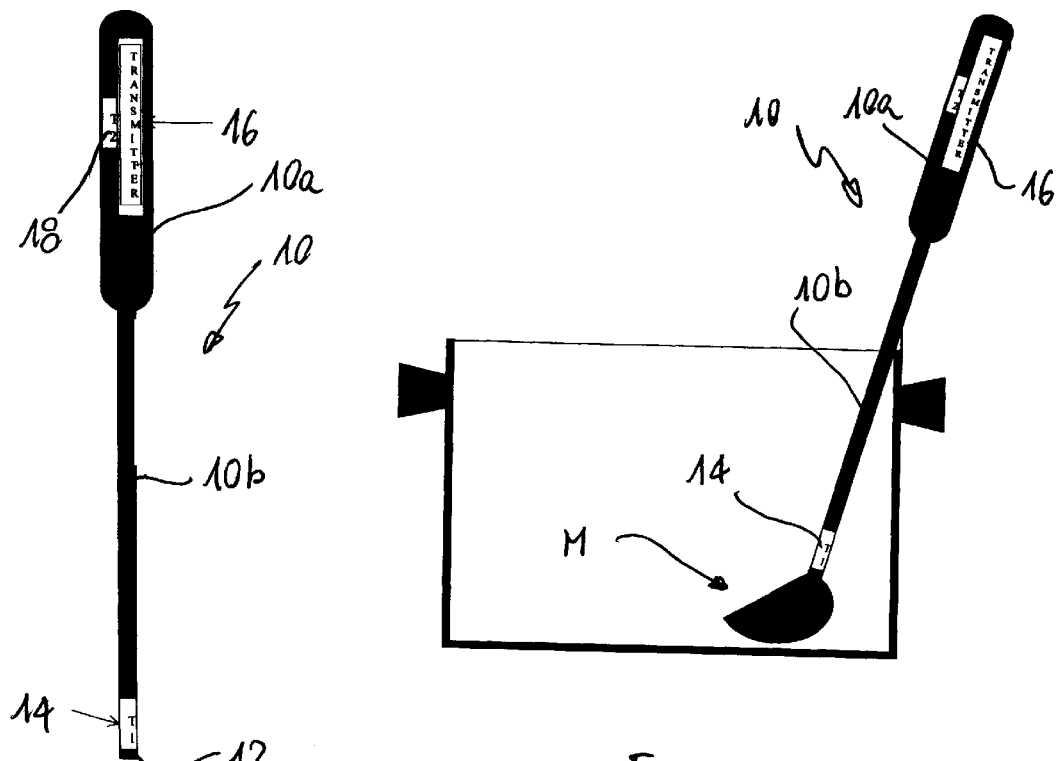
Fig. 1
Fig. 2
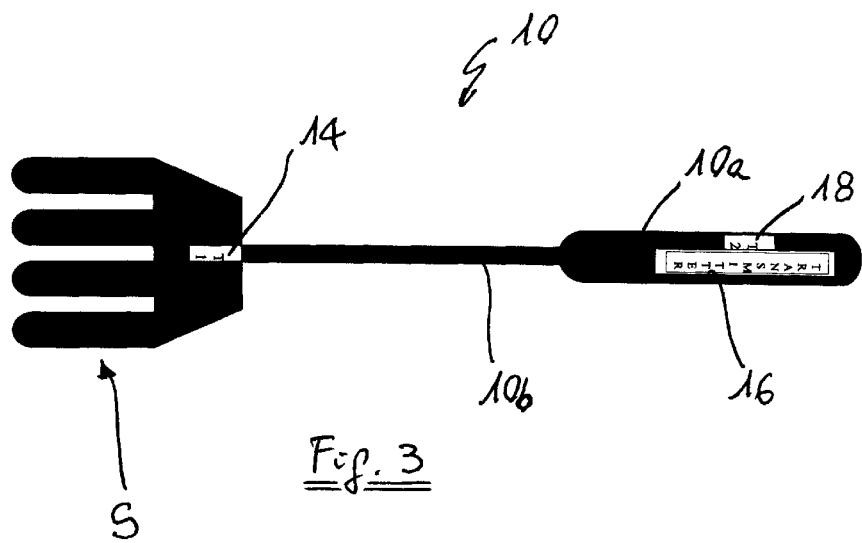
Fig. 3

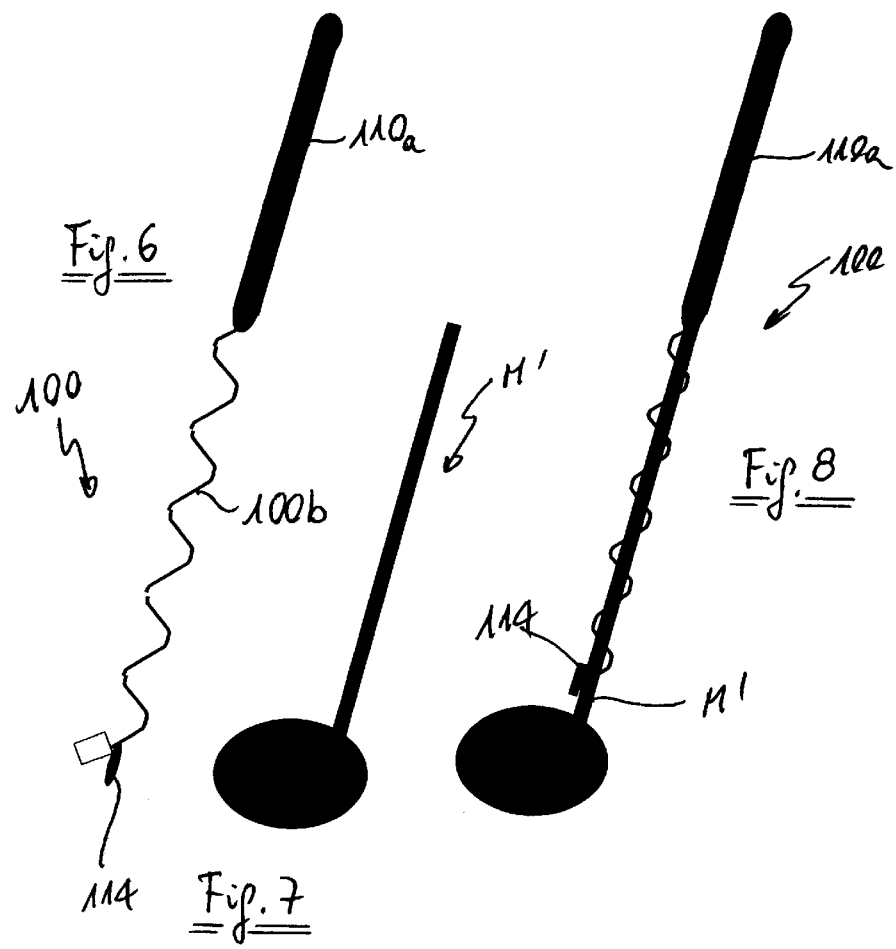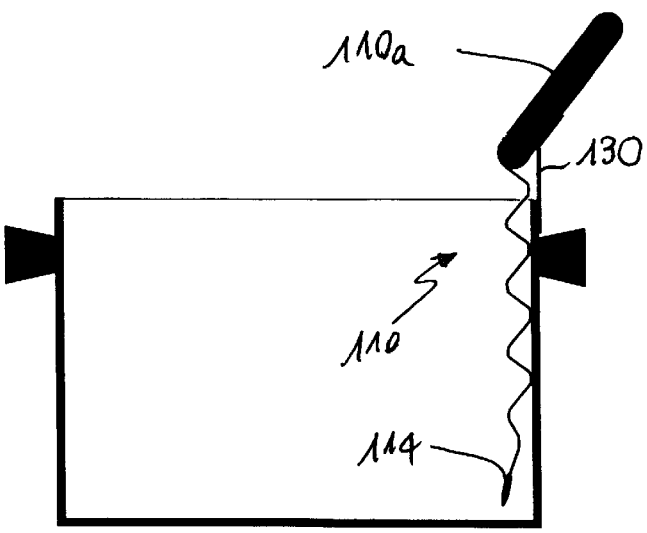

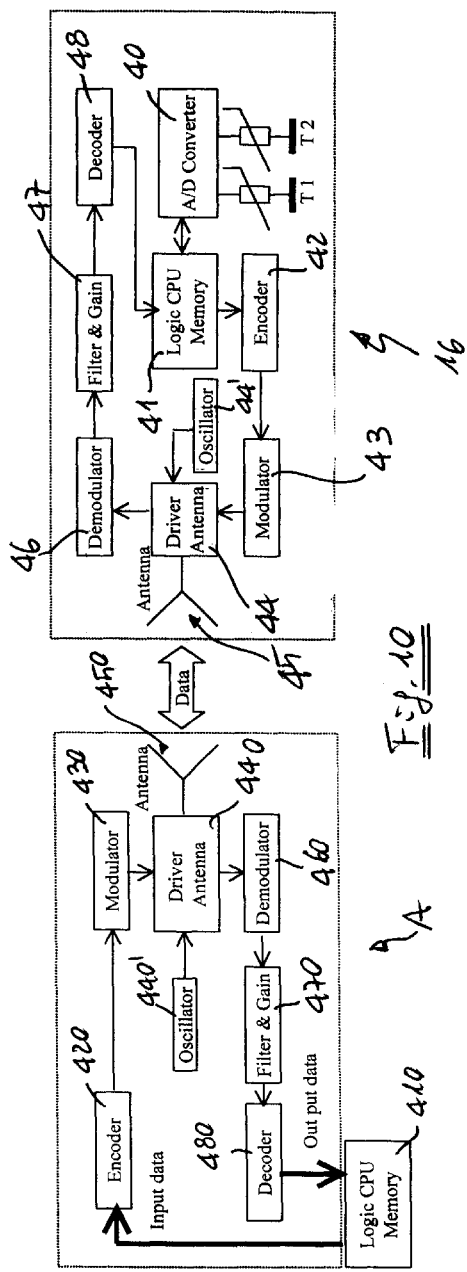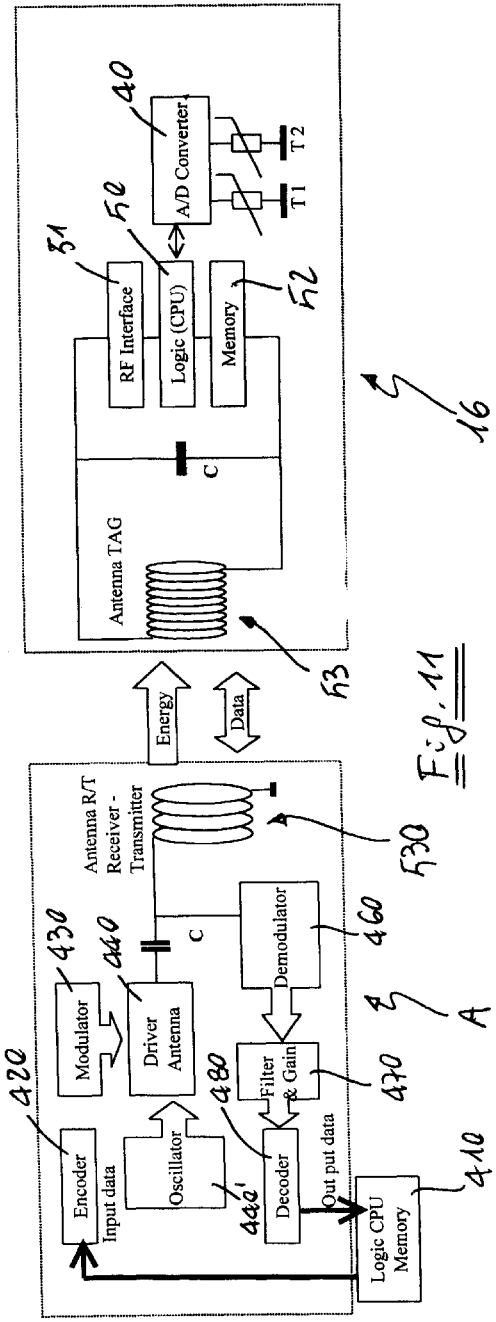

DEVICE FOR CONTROLLING A COOKING PROCESS

BACKGROUND OF THE INVENTION

1. Field of the Invention

The present invention relates to a device for collecting data relating to a cooking and/or heating process performed on a household kitchen appliance, in particular on a hob, of the type comprising a sensor associated with wireless data transmission means and means for receiving the signals transmitted by the data transmission means and connected to a management system for the household appliance for the purpose of permitting automatic control of the process.

2. Description of the Related Art

A device of this type is illustrated, for example, in application DE 44 39 777, in which the temperature sensor and the radio-frequency transmission means are arranged in the handle of an item of cookware (pan, skillet or the like). This has the disadvantage both of a certain disparity between the temperature detected by the sensor and the temperature of the food contained within the item of cookware and of the necessity of providing a plurality of items of cookware each having a handle fitted with a sensor and transmitter.

SUMMARY OF THE INVENTION

The object of the present invention is to provide a device of the type stated at the beginning of the description, which allows the above-stated disadvantages to be overcome in a simple and economic manner.

According to the invention, said object is achieved in that the sensor is fitted substantially at one end of a kitchen utensil suitable for coming into contact with the food to be cooked and/or heated, and in that the data transmission means are arranged substantially in a handle of the kitchen utensil.

The definition of kitchen utensil includes all types of ladles, slotted spatulas, spoons, forks and the like used for stirring and/or removing the food during cooking or heating. The definition of sensor includes any type of sensor, for example temperature, conductivity, level, color, density, acceleration or vibration sensors. In the event that the sensor is a conductivity sensor, it can be used to check whether the end of the kitchen utensil is actually in contact with the liquid in the item of cookware and simultaneously to monitor changes in conductivity due to the addition of salt or starchy foods (pasta, potatoes etc.). According to a preferred embodiment of the invention, the kitchen utensil has a removable portion at the first end, such that the user can easily change one type of kitchen utensil into another without losing the technical features associated with the presence of the sensor and the associated signal transmission means. In some cases, when the user does not consider it necessary to stir the food contained, for example, in an item of cookware, the utensil can be used without the removable portion, i.e. purely to collect and transmit the temperature of the food to the domestic appliance control unit.

According to another preferred embodiment of the invention, the sensor and associated transmitter can easily be fitted to a conventional kitchen utensil.

According to another variant of the invention, the kitchen utensil (once the portion suitable for mixing the food has been removed) is fitted in a hole in a suitable lid of an item of cookware, said lid advantageously being of the type adaptable to different types of cookware. To this end, said lid has a substantially conical shape capable of fitting into different diameters of pans or the like.

BRIEF DESCRIPTION OF THE DRAWINGS

Further advantages and features of the control device according to the invention will emerge from the following detailed description, which is provided purely by way of non-limiting example, with reference to the attached drawings in which:

FIG. 1 is a diagrammatic view of a kitchen utensil according to the invention in its first configuration;

FIG. 2 is a diagrammatic view of the kitchen utensil in FIG. 1 fitted with an accessory in a configuration for use as a ladle;

FIG. 3 is a view of the utensil in FIG. 1 fitted with an accessory suitable for imparting the function of a slotted spatula to the utensil;

FIG. 6 is a diagrammatic view of a kitchen utensil according to another variant;

FIG. 7 is a diagrammatic view of an accessory to be used with the utensil in FIG. 6;

FIG. 8 is a diagrammatic view of the appearance of the kitchen utensil in FIG. 6 fitted to the accessory in FIG. 7;

FIG. 9 is a diagrammatic view of a variant of the utensil of FIG. 6 configured for use as a sensor;

FIG. 10 is a block diagram of a transceiver associated with the kitchen utensil according to the invention; and FIG. 11 is a block diagram similar to the diagram in FIG. 10 and illustrates a "transponder"-type signalling device associated with the kitchen utensil according to the invention.

DESCRIPTION OF THE PREFERRED EMBODIMENT

Figure 4:
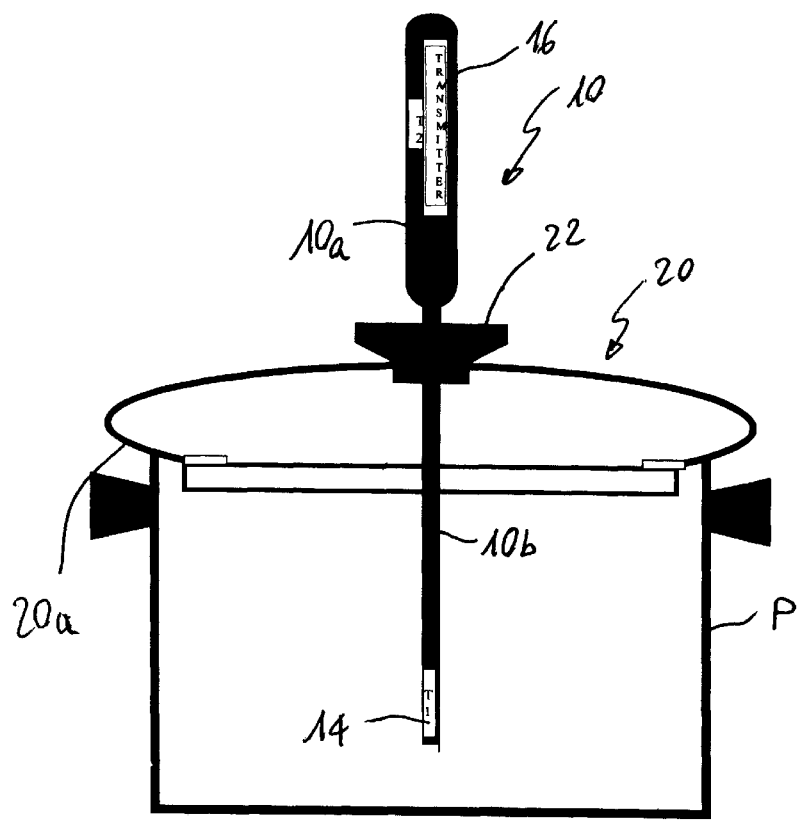
FIG. 4 is a view of the utensil in FIG. 1 used in combination with a suitable lid according to the invention.

With reference to the drawings, 10 denotes the overall kitchen utensil comprising a hollow handle 10a connected to a tubular shaft 10b, the free end 12 of which is associated with a first temperature sensor 14. The sensor 14 is electrically connected to a transmitter 16 contained in the handle 10a which, as will be clear from the description below, co-operates with a receiver with which the hob is equipped, said receiver being connected to the hob's central control unit (not shown). The handle 10a of the utensil 10 is moreover equipped with a second temperature sensor 18 suitable for measuring the temperature of the handle itself. The temperature sensors 14 and 18 have low thermal inertia and can, for example, be NTC, KTY, RDT sensors or thermocouples.

In a first variant of the invention, the sensors and the transmitter are provided with electrical power by batteries (not shown) accommodated in the handle 10a and the batteries are advantageously rechargeable. In this case, the handle 10a can be equipped with a photovoltaic cell, which ensures that the batteries remain charged.

An accessory can readily be fitted in a manner known per se to the end 12 of the kitchen utensil 10, which accessory is capable of allowing the kitchen utensil 10 to be usable for all purposes such as a ladle, slotted spatula, serving spoon, potato masher or the like, without losing its function as a temperature sensor suitable for automatically managing the cooking and/or heating process. For example, FIG. 2 illustrates the use of an accessory M that converts the utensil 10 into a ladle, while FIG. 3 illustrates the use of an accessory S that converts the kitchen utensil 10 into a slotted spatula.

Figure 5:
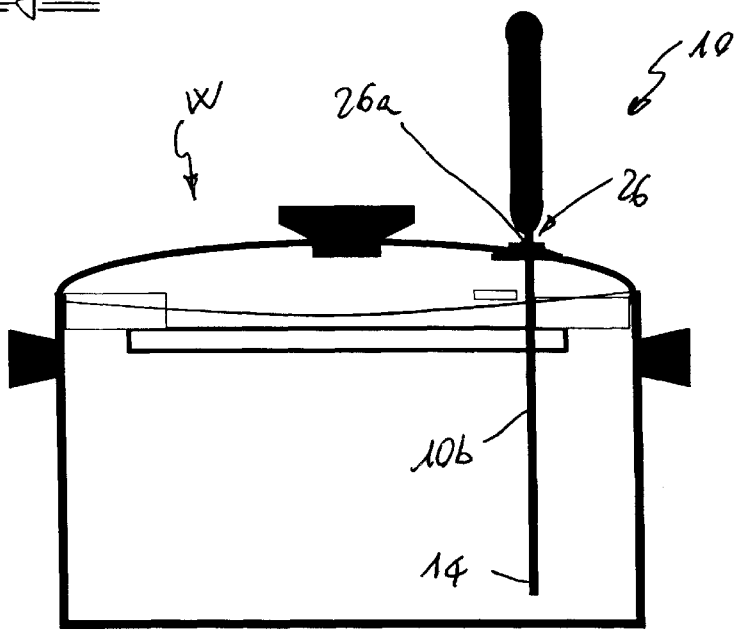
FIG. 5 is a similar view to FIG. 4 and illustrates the use of the utensil in FIG. 1 in association with the lid of a pan for steam cooking.

FIGS. 4 and 5 illustrate the use of the kitchen utensil 10 with two different types of lids. FIG. 4 shows a special lid 20, which is shaped such that its lower face 20a is substantially conical in shape so that it is readily able to fit into pans P of differing diameters. A hole 24 is provided centrally in the lid 20, corresponding to the lid handle 22, through which hole is passed the shaft 10b of the kitchen utensil 10, in this case without mixing or removing accessories, acting solely as a temperature sensor. The hole 24 can also be made non-centrally in the lid 20. FIG. 5 shows the use of the utensil 10 in association with the glass lid of a steam cooking pan W, the shaft 10b of the utensil 10 being inserted into a suitable steam vent hole 26 equipped with a rubber seal 26a. The kitchen utensil according to the invention can advantageously be used with pressure cookers. In this case, a temperature and pressure sensor is fitted to the end 12 of the kitchen utensil 10.

FIG. 6 illustrates a variant of the kitchen utensil according to the invention, in which the handle 100a is integral with a spiral-shaped shaft 110b also equipped at its free end with a temperature sensor 114. The particular shape of the shaft 110b makes it easy to fit accessories (such as that denoted M' in FIG. 7) in a similar manner to that already described for the arrangements of FIGS. 2 and 3.

FIG. 9 illustrates a variant of the kitchen utensil 100 shown in FIG. 6 in which the handle 110a is equipped with a lateral support 130 suitable for co-operating with the side wall of a pan for the purpose of maintaining the temperature sensor 114 in a stable position at a predetermined distance from the bottom of the pan.

FIG. 10 provides a diagrammatic description of the circuit diagram of the receiver/transmitter 16 associated with the handle 10a of the kitchen utensil 10 and powered, for example, by batteries, together with the diagram of the transmitter/receiver A associated with the hob (not shown). The receiver/transmitter 16 has one or more sensors T1, T2 (for temperature, pressure etc.) connected to an a/d converter 40, which is in turn connected to a central processing unit 41 equipped with memory. The central unit 41 processes the signal received from the sensors and, by means of an encoder 42 and a modulator 43, supplies the driver module 44 of an antenna 45, to which an oscillator 44' is connected. The part for processing the signal received branches off the control module 44 of the antenna 45, said processing part comprising a demodulator 46, a filter 47 and a decoder 48, culminating at the central processing unit of the transmitter/receiver 16.

The part of the transmitting/receiving circuit A associated with the hob comprises substantially the same components as the part associated with the handle 10a of the kitchen utensil 10 and identical components are denoted by identical reference numerals multiplied by 100 [sic]. Obviously, the central processing unit 410 of the part of the circuit associated with the hob is connected to or is integral with the hob control unit, so as to permit automatic power control of the heating components, whether of electrical or gas type.

FIG. 11 shows a block diagram of the variant in which the transmitter 16 of the kitchen utensil 10 is a signaling device or "transponder" in which the sensor and electronic circuit associated therewith do not require an electrical power supply, since said circuit uses the energy captured from the electromagnetic field by the associated antenna. In FIG. 11, the reference number 50 denotes the processing unit associated with the transmitter 16, to which are in turn connected an RF interface 51 and a memory 52. A "TAG"-type antenna 53 is connected to this part of the circuit. The circuit A associated with the hob is substantially identical, except for the different type of antenna (denoted by the reference number 530) relative to the circuit described with reference to FIG. 10.

SAW (surface acoustic wave) technology with a piezoelectric substrate acting as sensor can be used in the handle 10a of the kitchen utensil 10.

The kitchen utensil according to the invention can advantageously be used for detecting the onset of boiling in a pan and for keeping the water boiling without wasting energy. The kitchen utensil according to the invention can moreover be used as an alarm, e.g. an audible alarm, to indicate when the liquid level falls below a predetermined level in the pan.

We claim:

1. A device for collecting data relating to a cooking and/or heating process performed on a household kitchen appliance, the device comprising a first temperature sensor associated with wireless data transmission means and means for receiving the signals transmitted by the data transmission means and connected to a management system for the household appliance for the purpose of permitting automatic control of the process, wherein the first sensor is fitted substantially at one end of a kitchen utensil suitable for coming into contact with the food to be cooked and/or heated, and a second temperature sensor is arranged in the handle of the kitchen utensil, and wherein the data transmission means are arranged substantially in the handle of the kitchen utensil.

2. The device according to claim 1, wherein the kitchen utensil comprises accessories suitable for fitting onto the end thereof equipped with a sensor.

3. The device according to claim 1, further comprising a lid suitable for co-operating with an item of cookware and equipped with a hole into which a shaft of the kitchen utensil can be inserted and supported.

4. The device according to claim 3, wherein the lid has a lower face that is substantially in the form of a truncated cone, such that it is able to fit into items of cookware of differing diameters.

5. The device according to claim 1, wherein the kitchen utensil comprises a substantially spiral-shaped shaft suitable for accommodating an accessory inserted into said shaft.

6. The device according to claim 1, wherein the sensor is associated with transponder-type data transmission means.

7. The device according to claim 1, wherein the sensor is of the surface acoustic wave type.

8. The device according to claim 1, wherein the second sensor is associated with alarm means suitable for warning the user about any malfunctions that can arise during the cooking and/or heating process.

* * * * *